United States Patent
Bensoussan et al.

(10) Patent No.: US 10,302,118 B2
(45) Date of Patent: May 28, 2019

(54) SAFETY CONNECTION DEVICE WITH AUTOMATIC RELEASE IN THE EVENT OF TRACTION GREATER THAN AN ADJUSTABLE THRESHOLD VALUE

(71) Applicants: Erik Bensoussan, Etoile sur Rhone (FR); Laurence Delatour, Beauvallon (FR)

(72) Inventors: Erik Bensoussan, Etoile sur Rhone (FR); Laurence Delatour, Beauvallon (FR)

( * ) Notice: Subject to any disclaimer, the term of this patent is extended or adjusted under 35 U.S.C. 154(b) by 0 days.

(21) Appl. No.: 15/316,480

(22) PCT Filed: Jun. 5, 2015

(86) PCT No.: PCT/FR2015/051493
§ 371 (c)(1),
(2) Date: Dec. 5, 2016

(87) PCT Pub. No.: WO2015/185873
PCT Pub. Date: Dec. 10, 2015

(65) Prior Publication Data
US 2017/0198739 A1 Jul. 13, 2017

(30) Foreign Application Priority Data
Jun. 5, 2014 (FR) ...................................... 14 55136

(51) Int. Cl.
*F16B 21/16* (2006.01)
*F16B 45/00* (2006.01)
(Continued)

(52) U.S. Cl.
CPC .............. *F16B 21/165* (2013.01); *A01K 1/04* (2013.01); *A01K 27/005* (2013.01); *F16B 45/00* (2013.01)

(58) Field of Classification Search
CPC ........ A01K 1/04; A01K 1/064; A01K 27/005; F16B 45/00; F16B 21/165; B68B 1/00;
(Continued)

(56) References Cited

U.S. PATENT DOCUMENTS 3,081,122 A * 3/1963 Jungersen ............ B64D 17/383
294/82.25
3,540,089 A * 11/1970 Franklin ............... A01K 27/005
119/776

(Continued)

FOREIGN PATENT DOCUMENTS

AU     A-25687/88     5/1989
EP     0 317 455 A1     5/1989

*Primary Examiner* — Amber R Anderson
*Assistant Examiner* — Nahid Amiri
(74) *Attorney, Agent, or Firm* — Seed IP Law Group LLP

(57) ABSTRACT

The device comprises a male assembly, in the form of a cylindrical part, engaged such that it is free to slide inside a female assembly, in the form of a sleeve with a central bore for receiving the male assembly, that defines an opening for engaging and an opening for disengaging of said male assembly, the said male and female assemblies include supplementary arrangements, which, in connected position, are able to abut against each other to stop the sliding of the male assembly in the direction of disengagement, where, in disconnected position, the said arrangements can release themselves from each other under the effect of axial tensile force greater than the predetermined threshold value, relatively applied on the male assembly in the direction of disengagement in order to separate one from the other of the said male and female assemblies.

8 Claims, 4 Drawing Sheets

(51) Int. Cl.
*A01K 1/04* (2006.01)
*A01K 27/00* (2006.01)

(58) Field of Classification Search
CPC ............... Y10T 403/11; Y10T 24/4755; Y10T 24/45461; Y10T 24/45335; B25J 15/0206; B25J 15/022
USPC .................. 403/109.1, 109.2, 109.6, 161
See application file for complete search history.

(56) References Cited

U.S. PATENT DOCUMENTS

| | | | | |
|---|---|---|---|---|
| 4,742,605 A * | 5/1988 | Ritacco | ................ | A01K 27/005 114/217 |
| 5,286,130 A * | 2/1994 | Mueller | .................... | B66C 1/66 294/215 |
| 6,058,686 A * | 5/2000 | Wheeler | .................... | B68B 1/00 54/6.1 |
| 6,694,574 B1 * | 2/2004 | Sheng | .................... | F16G 15/08 24/265 H |
| 7,575,389 B2 * | 8/2009 | Nance | ................ | E05B 47/0038 403/109.2 |
| 8,137,023 B2 * | 3/2012 | Greer | .................... | F16D 1/0894 403/306 |
| 8,646,820 B2 * | 2/2014 | Knox | ..................... | F16B 45/02 294/82.1 |
| 8,720,874 B2 * | 5/2014 | Tschida | ................ | F16B 19/109 269/229 |
| 9,284,181 B1 * | 3/2016 | Nieslanik | .................. | B68B 5/06 |
| 9,333,896 B2 * | 5/2016 | Dunmire | .................. | B60P 7/083 |
| 9,669,753 B1 * | 6/2017 | Royt | .................... | B60P 7/0853 |
| 2006/0085954 A1 * | 4/2006 | Chen | ..................... | F16B 21/12 24/265 H |
| 2007/0261210 A1 * | 11/2007 | Chen | ..................... | F16B 21/165 24/265 H |
| 2012/0210542 A1 * | 8/2012 | Yang | .................... | F16B 21/165 24/369 |
| 2014/0143986 A1 * | 5/2014 | Genova | ................ | A01K 27/005 24/369 |
| 2015/0069775 A1 * | 3/2015 | Knox | .................... | F16B 45/00 294/82.15 |

* cited by examiner

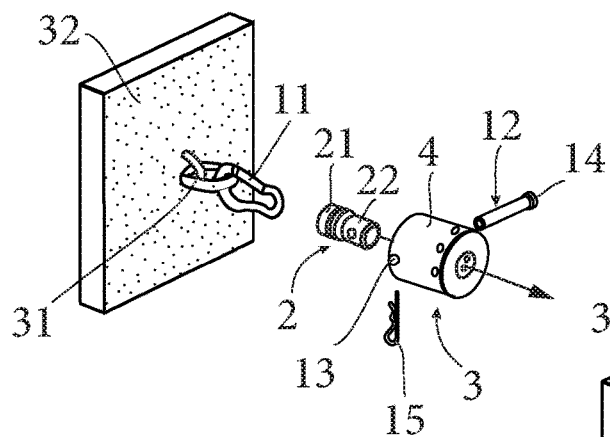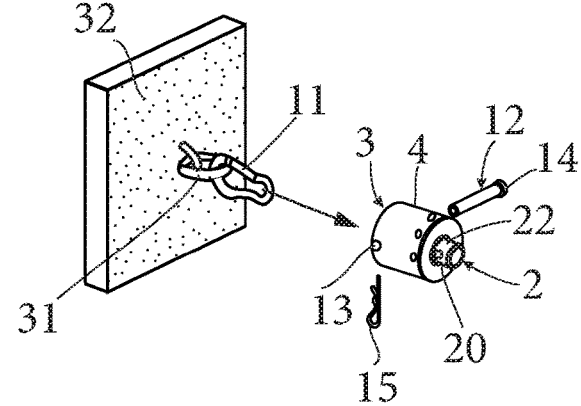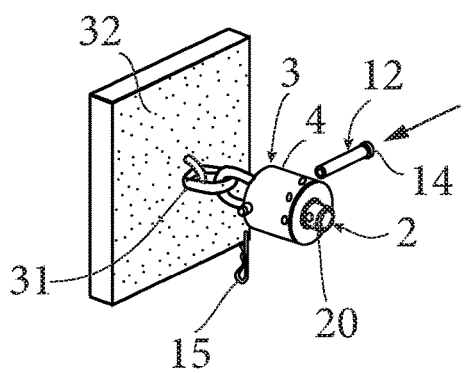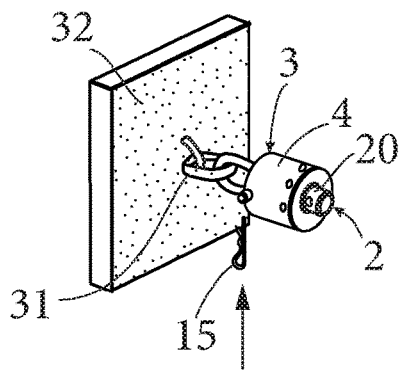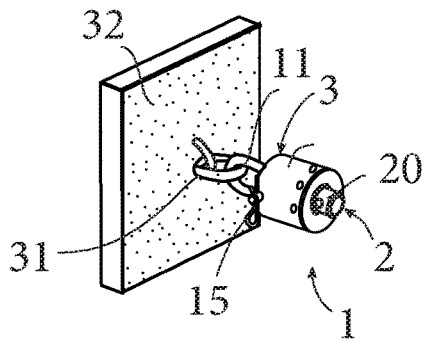

SAFETY CONNECTION DEVICE WITH AUTOMATIC RELEASE IN THE EVENT OF TRACTION GREATER THAN AN ADJUSTABLE THRESHOLD VALUE

BACKGROUND

Technical Field

This invention relates to a safety connection device that opens automatically when a tensile force greater than a threshold value is applied to it.

Description of the Related Art

As an advantage, the threshold tensile force that can trigger the opening of the device is adjustable. Moreover, according to the invention, the device is reusable and can be reconnected.

This device can, for example, be used while practicing horseback riding or when taking care of horses or other animals, which must be attached to a fixed point.

In fact, when a horse is attached to a fixed point, especially by using a lanyard or a rope attached to a ring fixed in the wall, it sometimes "pulls backwards." This situation usually occurs when the horse is frightened for some reason and begins to panic. It then brutally throws itself back and pulls on the clip with all its strength to cut loose.

In this state of panic, the horse can get seriously injured and up to the point where it can rupture its cervical if we do not release it at once. Now, while pulling backwards, the horse tightens the knots that hold it to the ring, making any attempt at release impossible. The only solution then is to cut the rope as quickly as possible.

However, if such a situation occurs when there is no one around or it happens in front of people who do not have knives or who cannot cut the rope fast enough since it is generally very strong and difficult to cut, the consequences can be serious.

To solve this problem, different solutions have been proposed in the prior art.

For example there are elastic devices, called elastic lanyards, that are interposed between the halter of the horse and the ring attached to the wall, and which increases in length as the horse pulls back.

However, using such elastic ropes can be very dangerous to the animal. In fact, in some cases it happens that the horse, after being abruptly pulled back, finds itself propelled forward through elastic reaction and hits the wall violently with its head. Such shock can cause irreversible damage to the animal, sometimes even kill it.

Connecting devices have also been proposed in the prior art, which break automatically when the pull of the horse is greater than the breaking strength value. This can, for example, be a simple weaker cord, interposed between the lanyard of the horse and the ring fixed in the wall, as also more sophisticated anti-panic devices.

While such devices solve the technical problem by automatically releasing the horse to prevent it from hurting itself, they nevertheless have a number of disadvantages.

These devices typically operate by the breaking of an element having the weakest resistance. They are therefore destroyed on use and cannot be put back in place and reused thereafter.

Furthermore, the strength required for safety opening of the device is only approximately known and cannot be changed. It cannot be adjusted to suit the situation, especially the strength, age or weight of the horse.

Finally, these devices are mostly made of metal and can hurt the animal, because after the device breaks, the piece connected to the lanyard of the animal may strike it violently due to panicked, abrupt and disorderly movements of the animal.

For all these reasons it would be desirable to have a safety connector that is efficient, reusable, adjustable and safe for the animal.

This is the objective that the invention proposes to achieve.

BRIEF SUMMARY

In order to solve this technical problem, the invention offers a safety connection device with automatic release under the effect of an axial tensile force exerted on it, which is greater than a predetermined threshold value.

According to the invention, the safety connection device is notable in that it comprises a male assembly that is freely engaged by being slid inside a female assembly. The male and female assemblies include supplementary arrangements, which, in connected position, are able to abut against each other to stop the sliding of the male assembly in the direction of disengagement, where, in disconnected position, the said arrangements can release themselves from each other under the effect of axial tensile force greater than the predetermined threshold value, relatively applied on the male assembly in the direction of disengagement in order to separate one from the other of the said male and female assemblies.

While, according to the invention, the device is particularly suitable for being used in the field of horseback riding and horse breeding, its use is in no way limited to such an application.

The device, according to the invention, can be used for all applications requiring an axial tension limiter and for which a safety disconnection is desired when a threshold tensile value is reached.

As an advantage, each one of the male and female assemblies include means for hooking an element; at least one of the elements is capable of exerting the axial tensile force in the direction opposite to the other element.

In this way, the device according to the invention may equally be connected on the one hand to a fixed point and on the other to a movable element (object, animal or person) capable of exerting a tensile force; or to two mobile elements each exerting, or being able to exert, a tensile force in a generally opposite direction.

Some possible examples of possible uses of the device according to the invention are being mentioned (list not exhaustive):

When a load has to be lifted or pulled by a man, an animal or by using a handling equipment (crane, hoist, trolley, etc.), and for safety or other reasons it is necessary to prevent the lifting or pulling of too much weight, in order, for example, to avoid injuries to humans or animals or to prevent damaging the handling equipment; when an animal is attached to a fixed point and is likely to injure itself by pulling hard on its tie;

when a person, an animal or a device is connected to a mobile load or part, and it is required to detach him/it from this mobile load or parts if the sustained stress exceeds the safety threshold;

when two machines or animals pull in opposite directions on the same device that needs to be preserved.

In general, the device according to the invention may advantageously be used in any situation where it is desirable to automatically disconnect two previously connected assembles, when the tensile force being exerted on them reaches a threshold limit.

This will thus ensure human or animal safety and/or preserve the integrity of goods, when they may be subject to excessive tensile force.

Preferably, the safety connection device comprises means for adjusting the engagement of one of the supplementary arrangement on the other during the abutment, so as to adjust the predetermined threshold value of the axial tensile force required for separating the male and female assemblies.

According to a specific embodiment of the invention, one of the supplementary arrangements is formed by a shoulder extending perpendicularly to the direction of disengagement, and capable of abutting against the other supplementary arrangement in the position of engagement.

According to a specific embodiment, one of the supplementary arrangements is retractable in relation to the other under the effect of axial tensile force greater than the predetermined threshold value.

Furthermore, the shoulder intended to abut against a supplementary arrangement, advantageously has an inclined surface to facilitate release of the abutment under the effect of axial tensile force greater than the predetermined threshold value.

According to a specific embodiment of the invention, one of the supplementary arrangements is retractable in relation to the other under the effect of axial tensile force greater than the predetermined threshold value.

In fact, one of the supplementary arrangement may, for example be in the form of at least one retractable ball screw, arranged in a transverse threaded bore. The retractable ball is capable of abutting against the other supplementary arrangement in the position of connection.

As an advantage, the device comprises a plurality of retractable ball screws, arranged in multiple transverse threaded bores, and habitually distributed around a longitudinal axis corresponding to said direction of disengagement.

According to specific embodiments, the female assembly is, e.g., in the form of a sleeve having a central bore for receiving the male assembly, and defining one opening of engagement and one opening of disengagement of said male assembly. The male assembly is in the form of a cylindrical part adapted to slide within the female assembly.

BRIEF DESCRIPTION OF THE SEVERAL VIEWS OF THE DRAWINGS

Other characteristics and advantages of the invention will appear on reading the detailed description which follows, such description made with reference to the accompanying drawings wherein:

FIGS. 4 to 12 are schematic perspective views explaining the functioning of the connection device, with:

Figure 1:
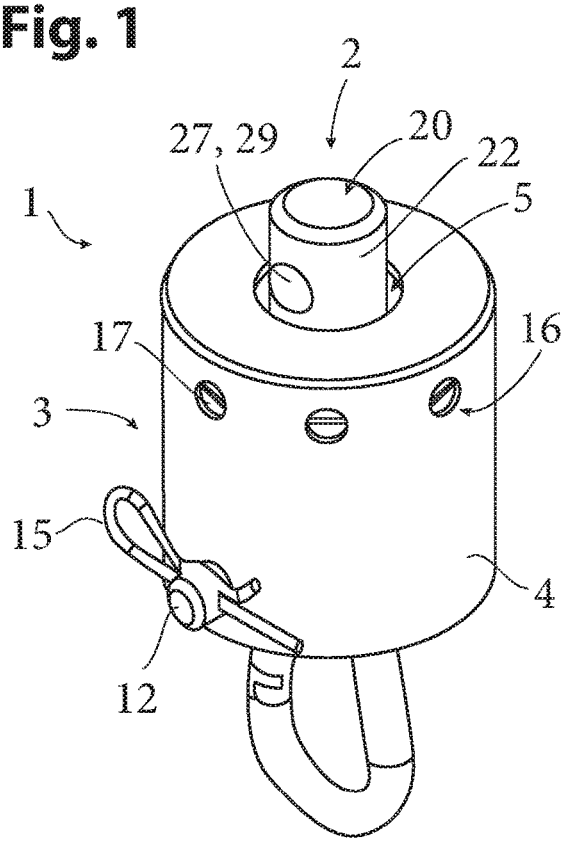
FIG. 1 is a perspective view of an example of connection device according to the invention.
Figure 3:
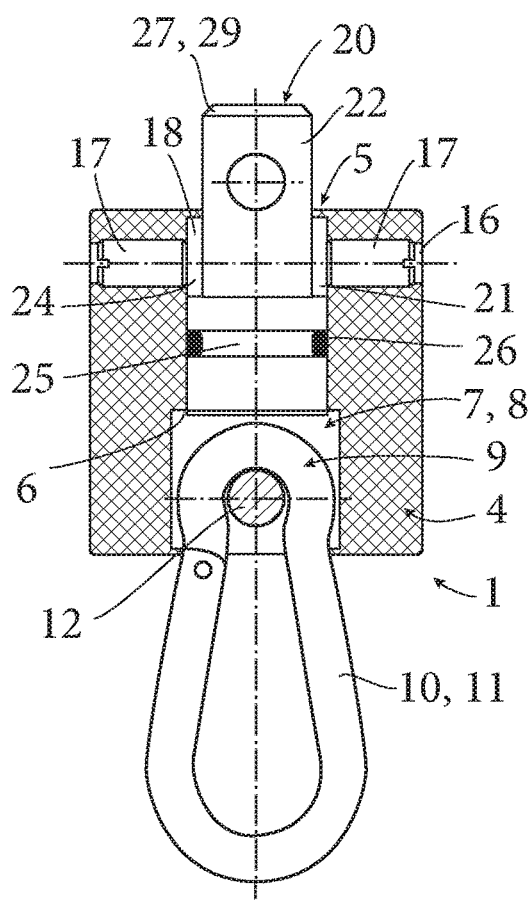
FIG. 3 is a longitudinal section view, along the section plane of FIG. 2 of the FIG. 1 connection device.
Figure 2:
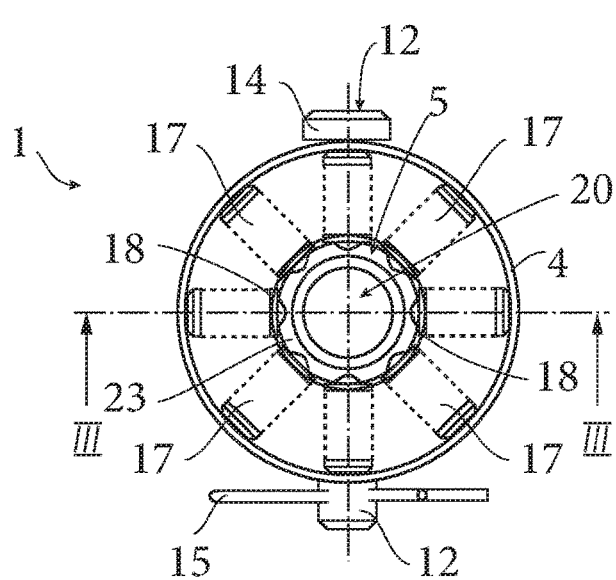
FIG. 2 is a top view of the FIG. 1 connection device.
Figure 4:
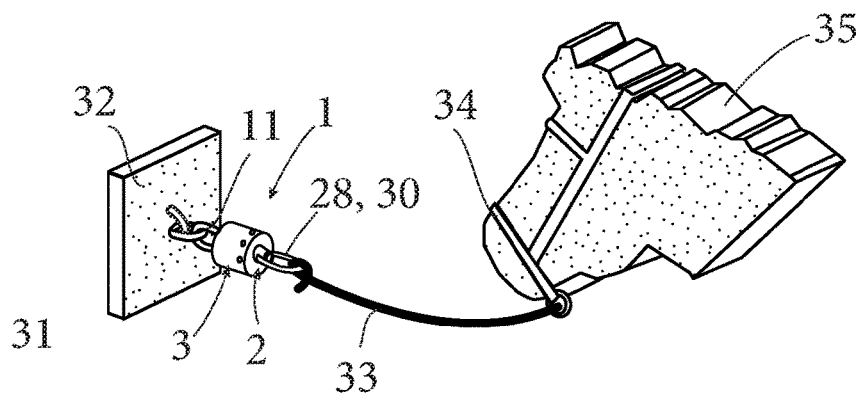
Figure 5:
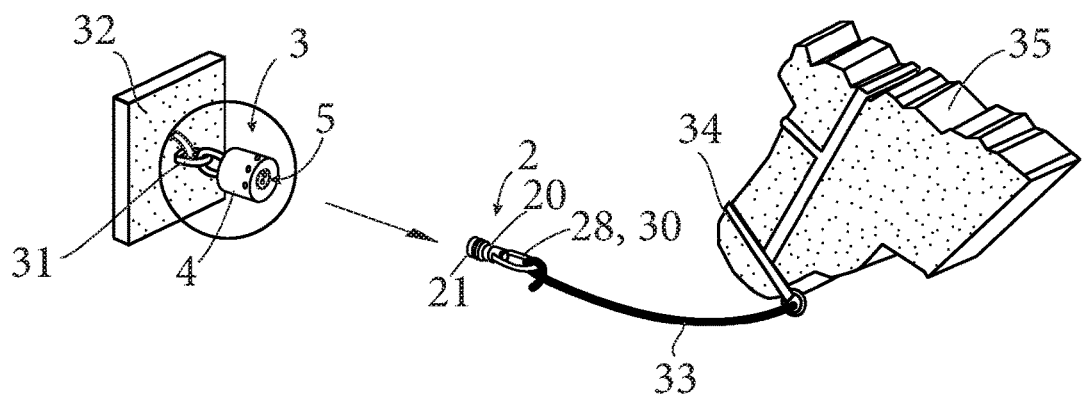
Figure 6:
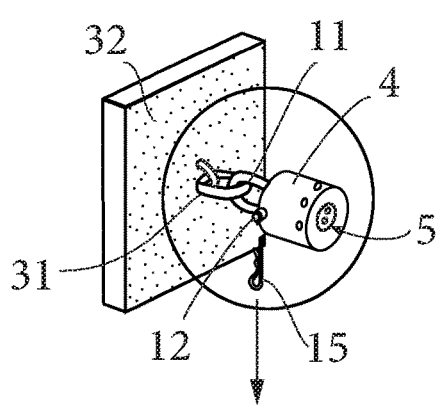
Figure 7:
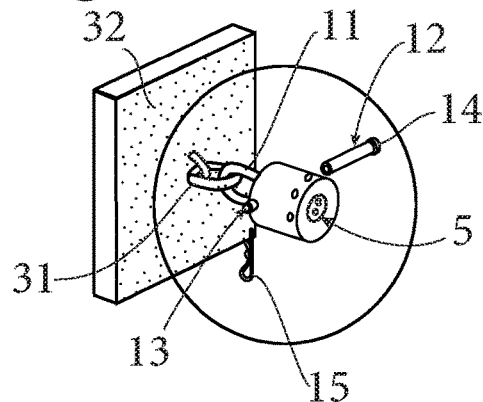
Figure 13:
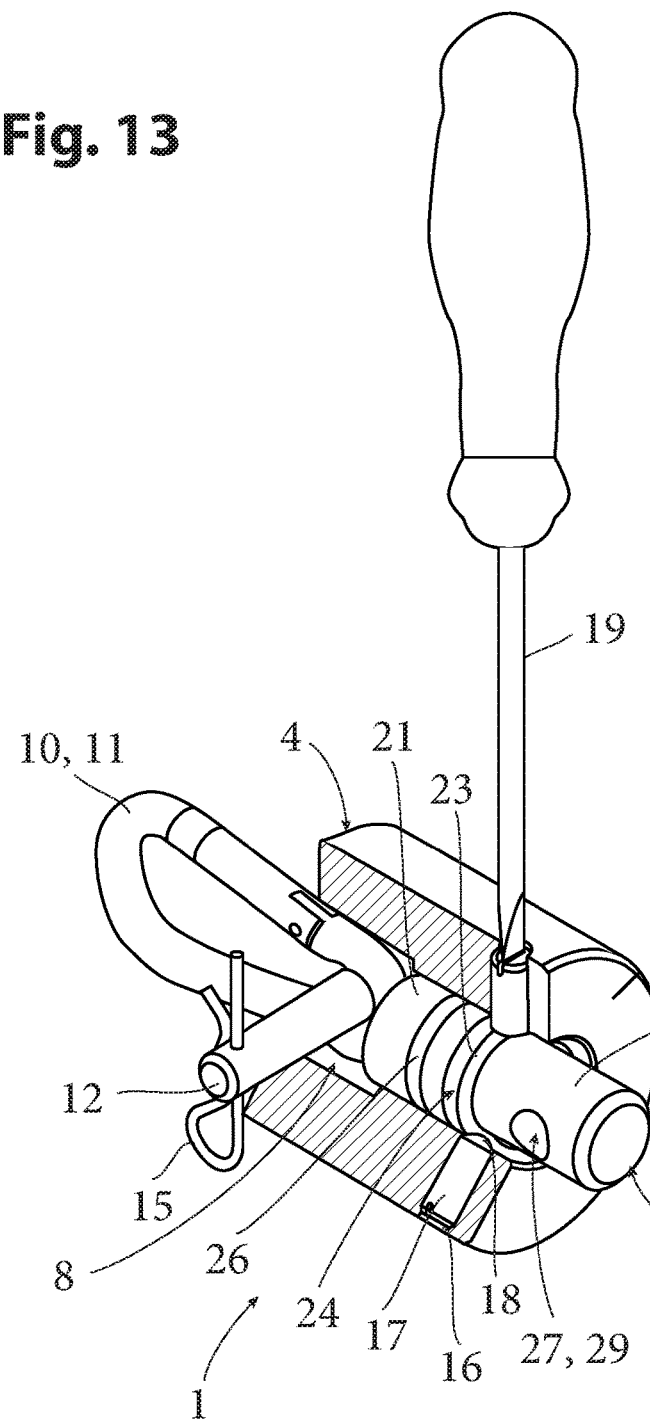
Figure 14:
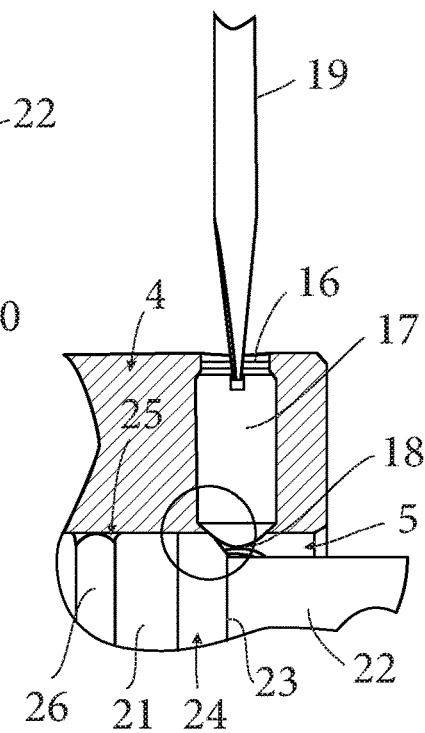

a first sequence, shown in FIGS. 4 and 5, which illustrates the safety disconnection of the connection device, and a second sequence, shown in FIGS. 6 to 12, which illustrates the successive steps for reconnecting the connection device for its reuse;

FIG. 13 is a cutaway perspective view of the FIG. 1 connection device illustrating the adjustment of threshold value of the allowed tensile force;

FIG. 14 is an enlargement of a detail of FIG. 13.

DETAILED DESCRIPTION

The safety connection device according to the present invention will now be described in detail with reference to FIGS. 1 to 14. Equivalent elements shown in different Figures will bear the same numeric references.

The remainder of this description will define the terms top and bottom, upper and lower, etc., depending on the orientation adopted by the connection device shown in FIG. 1. It is obvious that this orientation will not necessarily be maintained while in use.

In the various figures, a preferred example is shown of a connection device 1 according to the invention.

This connection device 1 comprises two main assemblies: a male assembly 2 and a female assembly 3, with one engaged inside the other in position of connection and capable of separating from one another in position of disconnection. More specifically, the male assembly 2 is engaged such that it is free to slide inside the female assembly 3.

The female assembly 3 comprises a sleeve 4, preferably cylindrical, having a central bore 5, opening out on the upper part of the sleeve 4 and extending in its axial direction. This central bore 5 is intended to receive inside it the male assembly 2, which is coaxially engaged in the position of connection of the device 1. The central bore 5 therefore has a diameter adapted to the dimensions of the male assembly 2.

Preferably, the central bore 5 extends, after a shoulder 6, through a coaxial bore 7 of larger diameter opening out on the lower part of the sleeve 4 and thereby forming, downwards, an opening of engagement 8 of said male assembly 2. In contrast to the opening of engagement 8, the bore 5 opens out toward an opening of disengagement.

This opening of engagement 8 is intended to house the upper end 9 of an anchor 10, such as for example a clasp 11 in the shown embodiment, or a ring, a hook or any other similar device for attaching the female assembly 3 of the connection device 1 and thus connecting it to a fixed point or to an element capable of exerting or undergoing a tensile force.

The upper end 9 of the anchor 10 is held in a removable manner in the opening of engagement by means of a temporary holding mechanism, preferably a dowel 12 traversing through it, or by any other temporary attachment mechanism that can be devised by the expert.

The sleeve 4, for this purpose, comprises a cross bore 13 located at the level of the opening of engagement 8, which extends radially and opens out on both sides of the sleeve after passing through this opening of engagement 8.

This cross bore 13 allows engagement of the dowel 12 through the sleeve 4, via the opening of engagement 8 and thus through the upper end 9 of the anchor 10 which ensures that it is held in place.

The dowel 12 is removable and is held temporarily in the cross bore 13. The dowel 12 can be held in position, for example, by using a peripheral ring 14 having diameter greater than that of the cross bore 13, serving as an abutment for one end of the dowel 12 and by means of a pin 15 which is engaged in a removable manner to the other end of the dowel 12.

The sleeve 4 further comprises at least one, and preferably multiple threaded bores 16, arranged radially in a plane transverse to the sleeve 4 and traversing the outside of the sleeve 4 into its central bore 5. These threaded bores 16, substantially horizontal, are preferably uniformly distributed over the periphery of the sleeve 4. The preferred embodiment shown in the Figures comprises eight of them.

In each of these threaded bores 16 one screw 17 is engaged by tightening at the retractable end, for example round-headed screw but preferably ball screw 18. The other end of these screws is adapted to be operated from the outside by a common screwing tool. For example it can be slotted or Phillips type so that it can be used with a flat 19 FIGS. 13 and 14) or cross screwdriver respectively, or even the hexagon slotted type that can be worked with an Allen key.

The male assembly 2 of the connection device 1 according to the invention is made of one shaft 20 in two successive sections: a first section or lower section 21, substantially cylindrical and with a diameter substantially corresponding to that of the central bore 5 of the sleeve 4, while being slightly less than it so that it can be engaged with it, extended axially by a second section or upper section 22 of smaller diameter.

The lower section 21 of the shaft 20 and the upper section 22 having a smaller diameter are gradually connected, at a level of a chamfered area forming a shoulder 23 with inclined surface and can be used as a ramp. This shoulder 23 can, for example, be made as represented by using a washer 24.

In order to compensate for manufacturing tolerances and ensure suitable support of the lower section 21 of the male assembly 2 in the central bore 5 of the sleeve 4 in connection position of the device, the lower section 21 of the male assembly 2 may further comprise a circular groove 25 in which an O-ring 26 is preferably inserted.

The male assembly 2 lastly comprises, in the upper section 22 of the shaft 20, a receiving area 27 for a second anchor 28 for anchoring the male assembly 2 of the connection device 1 according to the invention and thus connecting it to a fixed point or to another element capable of exerting or undergoing a tensile force.

Although many other variants can be devised by those skilled in the art, the receiving area 27 on the embodiment shown consists of a single transverse through bore 29 wherein it is possible to insert, for example, a ring 30, a hook, a clasp, or directly a rope, strap, lash, tether, chain, lanyard, or the end of a harness or other appropriate anchor.

This receiving area 27 is made at the free end of the second section 22 of the shaft 20 which always stays accessible regardless of the position of the connection device 1 according to the invention, even when the male assembly 2 is engaged in the female assembly 3 of the device in position of connection.

According to another conceivable alternative, the receiving area 27 can directly act as an anchor 28 and be, for example, in the form of a loop projecting from the upper section of the shaft 20.

In connection position of the device 1 according to the invention shown in FIGS. 1 to 4, the male assembly 2 of the device is engaged in the female assembly 3. For this purpose, the shaft 20 of the male assembly 2 is inserted in the central bore 5 of the sleeve 4 so that the upper section 22 having smaller diameter of the shaft 20 comes opposite the threaded bores 16 of the sleeve 4 and the free end of this upper section 22 protrudes out of the sleeve 4 above it.

Ball screws 17 are engaged in threaded bores 16 of the sleeve 4 and are sufficiently recessed so that their retractable end, preferably their ball 18, protrudes into the central bore 5 of the sleeve 4 and they narrow its diameter at this level, thus making it lesser than that of the lower section 21 of the shaft 20, however being greater than or equal to that of the upper section 22 of the shaft 20.

Ball screws 17 thus hold the device according to the invention in position of connection when no force is exerted on it or when it is subjected to a tensile force intended to separate the two assemblies 2, 3 of the connection device 1 which is moderate, i.e., less than a threshold value. In fact, in this case, the retractable ends 18 of the ball screws 17 abut against the inclined shoulder 23 of the shaft 20 and obstruct the shaft 20 from coming out of the sleeve 4.

The operation of the connection device 1 according to the invention ensues evidently from the means described above. For a clearer understanding of the reader, it has been schematically shown in an example of use in FIGS. 4 and 12 and will be briefly described below.

The connection device 1 according to the invention was shown in FIG. 4 in position of connection. It is connected on one side by the clasp 11 of its female assembly 3 to a ring 31 fixed to a wall 32 thereby forming a fixed point. On the other side, it is connected by means of a ring 30 inserted in the through bore 29 of its male assembly 2 to a rope 33 connected to the harness 34 of a horse 35 capable of exerting a tensile force backwards to release itself.

As explained above, so long as the horse 35 does not pull on the rope 33 or does not exert a high tensile force, the ball screws 17 hold the device 1 in the connection position (FIG. 4).

When the horse 35 begins to pull very hard on the rope 33, for example if it starts "pulling backwards," it pulls on the male assembly 2 which moves in the central bore 5 toward the disengagement opening of the sleeve 4. Balls 18 of the ball screws 17 come against the inclined shoulder 23.

If the tensile force is greater than a threshold value, which corresponds to the force required to counter the elastic strength of the springs contained within the ball screw 17 and thus push the retractable balls 18 inside the body of these ball screws 17, the balls 18 retract gradually and free up the path in the central bore 5. The lower section 21 with largest diameter of the shaft 20 can then slide into the central bore 5 to come out of the sleeve 4 through the opening of disengagement. The device 1 according to the invention is now in disconnected position, its male assembly 2 and its the female assembly 3 are separated from one another as illustrated in FIG. 5. The horse 35 is thus released and runs no risk of getting injured.

The retraction of the balls 18 from the ball screws 17 is facilitated by the inclined nature of the shoulder 23 which forms a gradual support ramp on them. The resistance to disconnection resisted by the device 1 according to the invention may thus be more or less pronounced depending on the angle of inclination selected for the shoulder 23.

As an advantage, the connection device 1 according to the invention is reusable and can be very simply put back in position of connection.

To do this, simply remove the pin 15 (FIG. 6), then the dowel 12 (FIG. 7) of the female assembly 3.

The clasp 11 can then be removed out of the opening of engagement 8 of the sleeve 4 (FIG. 8). The male assembly 2 can then be placed in the female assembly 3 through the opening of engagement 8 that has a diameter greater than that of the central bore 5.

Once the male assembly 2 is correctly positioned in the female assembly 3, i.e., when the inclined shoulder 23 of the shaft 20 abuts against the balls 18 of the ball screws 17 which are automatically returned to the projecting position under spring action, simply put back the top end 9 of the clasp 11 in the engagement opening 8 of the sleeve 4 (FIG. 9), then block this clasp 11 using the dowel 12 (FIG. 10) and the pin 15 (FIG. 11).

The connection device 1 according to the invention is once again in connected position, ready to be reused (FIG. 12).

According to a particularly advantageous aspect of the invention, the connection device 1 can be adjusted as illustrated in FIGS. 13 and 14.

In fact, by pressing the ball screws 17 more or less in the threaded bores 16 of the sleeve 4, it is possible to adjust the pressure exerted by the balls 18 (or rods) of the ball screws 17 on the inclined shoulder 23 of the shaft 20 and thereby the threshold value of the traction force necessary to disconnect the device 1.

If it is desired, for example, that the device 1 disconnects less easily, i.e., the threshold value of the tensile force be increased, it is sufficient to press the ball screws 17 deeper in the threaded bores 16 and vice versa if the situation is reversed.

This adjustment can be made very easily, with a simple screwdriver or Allen wrench).

The connection device 1 according to the invention is remarkable for its simplicity of implementation. It is made exclusively of mechanical components, whose functioning is completely reliable and is independent of any external operating member. Many applications can be envisaged, which include, for example but not limited to, safety of humans and animals, protection of goods, etc.

Where the connection device is desired to be used for a human or an animal, it is preferable to use a lightweight material such as, for example, a resistant plastic material, specifically polyoxymethylene, to make the device. This will ensure safety of the person or the animal in question in case of impact with a section of the device during its disconnection. Using such plastic material also allows outdoor use of the connection device 1 according to the invention.

The invention is naturally not limited to the preferred embodiments described above and shown in various figures; the expert can make numerous changes to it and imagine other variants without departing either from the scope or from the framework of the invention defined by the claims.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A safety connection device with automatic release under the effect of an axial tensile force greater than a predetermined threshold value exerted on the safety connection device, wherein the safety connection device comprises:
    a male assembly including a cylindrical part;
    a female assembly including a sleeve having a central bore, an engagement opening for receiving the cylindrical part into the central bore at a first end of the sleeve, and a disengagement opening for discharging the cylindrical part from the central bore at a second end of the sleeve opposite to the first end of the sleeve;
    wherein the cylindrical part of the male assembly is engaged with the sleeve of the female assembly;
    wherein said male and female assemblies include respective supplementary arrangements, which, in a connected position of the safety connection device, abut against each other to prevent the cylindrical part sliding out of the bore through the disengagement opening, and which release themselves from each other upon application of the axial tensile force greater than the predetermined threshold value to the male and female assemblies such that the cylindrical part of the male assembly can slide out of the bore through the disengagement opening to separate said male and female assemblies from one another;
    wherein the male assembly includes a clasp for hooking the safety connection device to a first object capable of exerting the axial tensile force greater than the predetermined threshold value on the safety connection device and the female assembly includes a transverse through-bore for hooking the safety connection device to a second object capable of exerting the axial tensile force greater than the predetermined threshold value on the safety connection device; and
    wherein the safety connection device includes threaded bores for adjusting an engagement of the supplementary arrangements with one another to adjust the predetermined threshold value.

2. The safety connection device according to claim 1 wherein a first one of the supplementary arrangements includes a shoulder extending into the bore in a direction perpendicular to a central longitudinal axis of the bore, wherein the shoulder is capable of abutting against a second one of the supplementary arrangements in the connected position of the safety connection device.

3. The safety connection device according to claim 2 wherein the shoulder has an inclined surface to facilitate release of the first one of the supplementary arrangements from the second one of the supplementary arrangements in response to application of the axial tensile force greater than the predetermined threshold value to the male and female assemblies.

4. The safety connection device according to claim 1 wherein a first one of the supplementary arrangements is retractable in relation to a second one of the supplementary arrangements in response to application of the axial tensile force greater than the predetermined threshold value to the male and female assemblies.

5. The safety connection device according to claim 4 wherein the first one of the supplementary arrangements includes at least one screw and at least one retractable ball, the screw and retractable ball positioned in a threaded bore that extends in a direction transverse to a central longitudinal axis of the bore, wherein the retractable ball is capable of abutting against the second one of the supplementary arrangements in the connected position of the safety connection device.

6. The safety connection device according to claim 5 wherein the first one of the supplementary arrangements includes a plurality of screws and a plurality of retractable balls, the plurality of screws and the plurality of retractable balls positioned in a plurality of threaded bores, each of the threaded bores extending in a respective direction transverse to the central longitudinal axis of the bore, the plurality of threaded bores uniformly distributed around the central longitudinal axis of the bore.

7. A safety connection device with automatic release under the effect of an axial tensile force greater than a predetermined threshold value exerted on the safety connection device, wherein the safety connection device comprises:

a male assembly including a cylindrical part;

a female assembly including a sleeve having a central bore, an engagement opening for receiving the cylindrical part into the central bore at a first end of the sleeve, and a disengagement opening for discharging the cylindrical part from the central bore at a second end of the sleeve opposite to the first end of the sleeve;

wherein the cylindrical part of the male assembly is engaged with the sleeve of the female assembly;

wherein said male and female assemblies include respective supplementary arrangements, which, in a connected position of the safety connection device, abut against each other to prevent the cylindrical part sliding out of the bore through the disengagement opening, and which release themselves from each other upon application of the axial tensile force greater than the predetermined threshold value to the male and female assemblies such that the cylindrical part of the male assembly can slide out of the bore through the disengagement opening to separate said male and female assemblies from one another;

wherein the male assembly includes a clasp for hooking the safety connection device to a first object capable of exerting the axial tensile force greater than the predetermined threshold value on the safety connection device and the female assembly includes a transverse through-bore for hooking the safety connection device to a second object capable of exerting the axial tensile force greater than the predetermined threshold value on the safety connection device;

wherein a first one of the supplementary arrangements is retractable in relation to a second one of the supplementary arrangements in response to application of the axial tensile force greater than the predetermined threshold value to the male and female assemblies; and wherein the first one of the supplementary arrangements includes at least one screw and at least one retractable ball, the screw and retractable ball positioned in a threaded bore that extends in a direction transverse to a central longitudinal axis of the bore, wherein the retractable ball is capable of abutting against the second one of the supplementary arrangements in the connected position of the safety connection device.

8. The safety connection device according to claim 7 wherein the first one of the supplementary arrangements includes a plurality of screws and a plurality of retractable balls, the plurality of screws and the plurality of retractable balls positioned in a plurality of threaded bores, each of the threaded bores extending in a respective direction transverse to the central longitudinal axis of the bore, the plurality of threaded bores uniformly distributed around the central longitudinal axis of the bore.

* * * * *